United States Patent [19]
Sarh

[11] Patent Number: 5,896,637
[45] Date of Patent: Apr. 27, 1999

[54] ASSEMBLY TOWER

[75] Inventor: Branko Sarh, Huntington Beach, Calif.

[73] Assignee: McDonnell Douglas Corporation, Huntington Beach, Calif.

[21] Appl. No.: 08/719,456

[22] Filed: Sep. 25, 1996

[51] Int. Cl.⁶ .................................................. B23B 11/00
[52] U.S. Cl. ........................ 29/34 B; 29/33 K; 29/897.2; 29/428; 29/525.06; 227/51
[58] Field of Search .................. 29/897.2, 897.31, 29/714, 33 K, 34 B, 524.1, 243.53, 428, 430, 525.05, 525.06; 227/51; 901/1, 16

[56] References Cited

U.S. PATENT DOCUMENTS

| | | | |
|---|---|---|---|
| 3,534,896 | 10/1970 | Speller | 227/51 |
| 4,299,871 | 11/1981 | Forsch | 428/104 |
| 4,344,221 | 8/1982 | Pagani | 29/568 |
| 4,453,085 | 6/1984 | Pryor | 250/203 R |
| 4,590,578 | 5/1986 | Barto, Jr. et al. | 364/513 |
| 4,720,231 | 1/1988 | Pienta | 414/560 |
| 4,864,702 | 9/1989 | Speller | 29/34 B |
| 4,885,836 | 12/1989 | Bonomi | 29/524.1 |
| 4,937,929 | 7/1990 | Nokajima et al. | 29/430 |
| 4,964,497 | 10/1990 | Bundo et al. | 198/341 |
| 4,966,323 | 10/1990 | Speller | 227/51 |
| 4,967,947 | 11/1990 | Sarh | 227/52 |
| 5,098,024 | 3/1992 | MacIntyre et al. | 239/587.1 |
| 5,560,102 | 10/1996 | Micale | 29/897.2 |
| 5,615,474 | 4/1997 | Kellner | 29/703 |
| 5,664,311 | 9/1997 | Banks | 29/407.04 |

OTHER PUBLICATIONS

Linear Motion Products, Techno–isel brochure, pp. 57, 60–63.
Turning Dreams Into Reality Affordably, Techno–isel brochures.
Standard Endeffectars For Drilling and Rivetting, Brotje Automation brochure.
Seeing Is Believing, Innovision Corp. brochure.
Look to Lumenex for Vision System Solutions, Lumenex brochure.
Linera Motion Products, Techno–isel brochure, p. 57.

*Primary Examiner*—Daniel B. Moon
*Assistant Examiner*—James P. Calve
*Attorney, Agent, or Firm*—Harness Dickey & Pierce P.L.C.

[57] ABSTRACT

An assembly tower method and apparatus for use with an assembly jig having a tower guidance apparatus. The assembly tower includes a base, a platform coupled to the base for movement relative thereto, a drive system for moving the base relative to the ground and for moving the platform to the base in response to selected control signals. A Control System is included in the assembly tower for selectively generating and communicating the respective control signals to the drive system. A tower guidance apparatus is engagable with a guidance element of the tower to limit movement of the base relative to the ground in accordance with a predefined path. The tower carries a tool for assisting in constructing large aircraft components such as fuselage panels which are supported on the assembly jig.

18 Claims, 5 Drawing Sheets

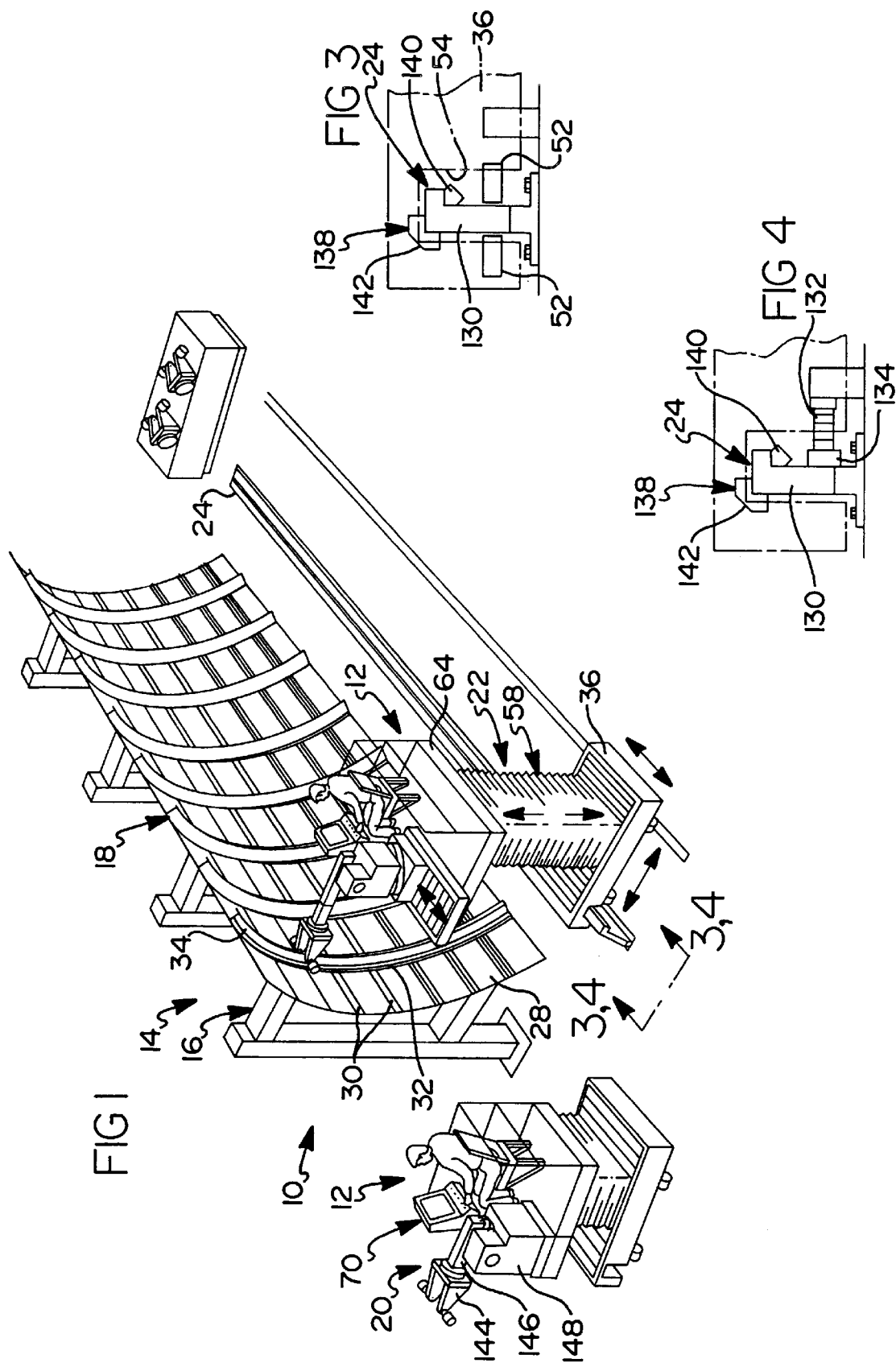

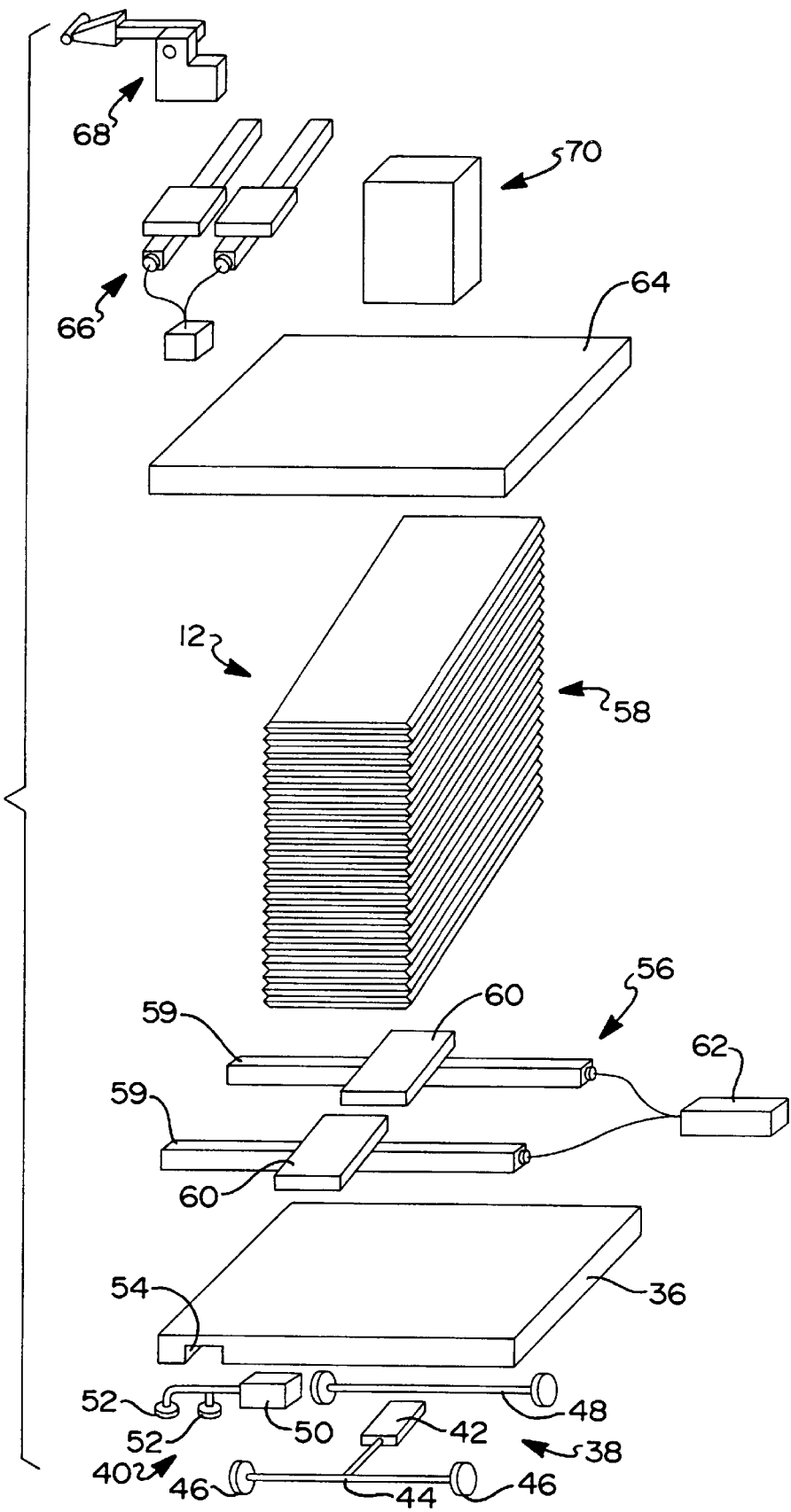

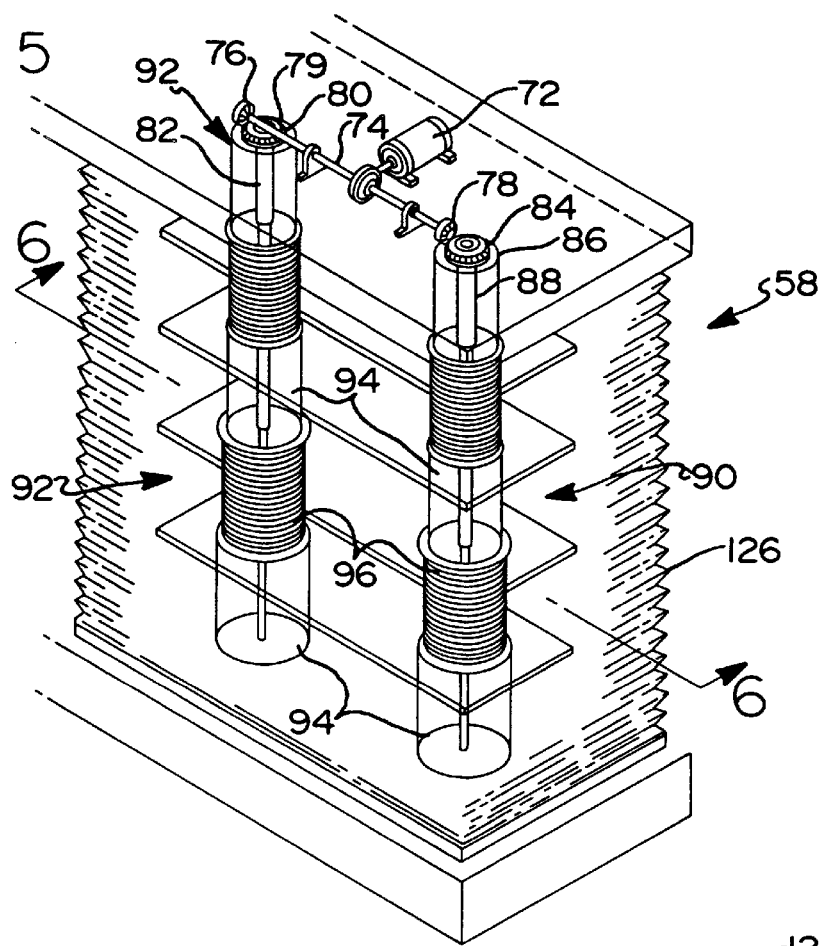
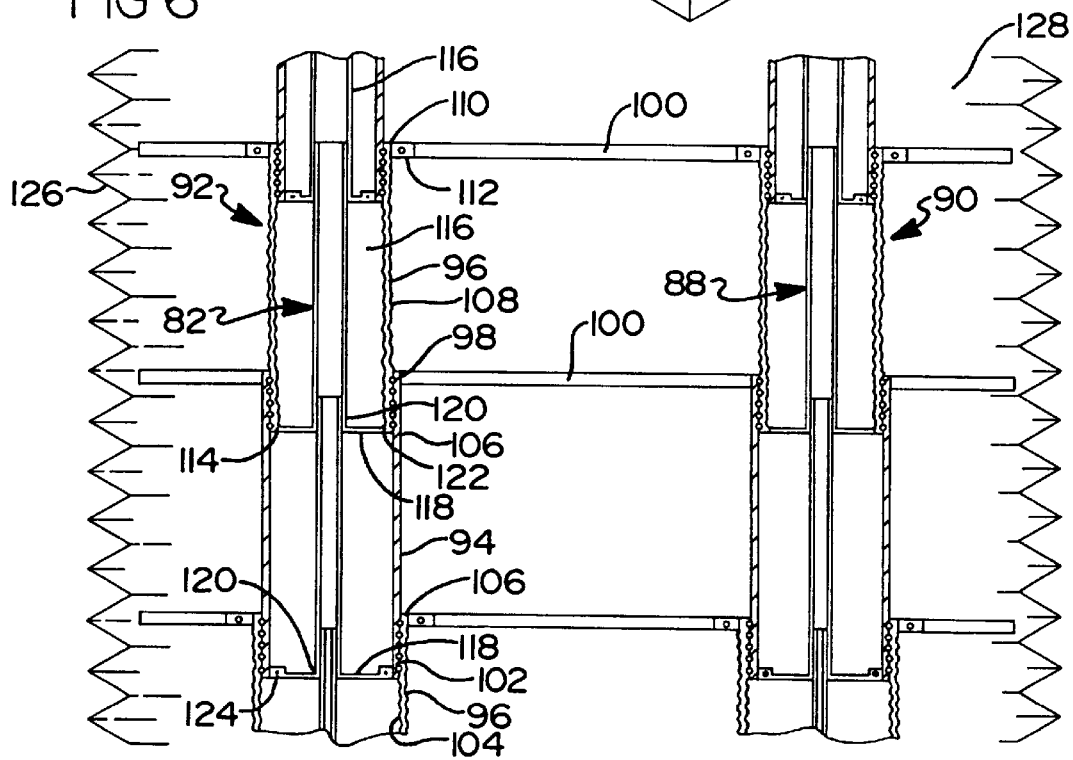

ASSEMBLY TOWER

BACKGROUND OF THE INVENTION

1. Technical Field

The present invention relates generally to an assembly system for constructing a body having interconnected members and, more particularly, to an assembly system having an assembly tower that provides a movable platform for positioning and connecting the various members of an aircraft barrel panel.

2. Discussion

The manufacture of aircraft barrel assembly panels is generally separated into an assembly stage wherein the respective members of the panel are positioned and temporarily secured to one another and a securement stage wherein the members of the panels are permanently fixed relative to one another. Aircraft panel assembly is particularly difficult because the panels are approximately thirty feet long and ten feet high. Commonly, a large fixed platform is located proximate to the panel during the assembly stage in order to provide the assembler with access to a majority of the panel while a movable tower having a fastening tool is used during the securement stage.

During the assembly stage, the often cumbersome panel members are laid out relative to a fixture, properly positioned with respect to one another, and temporarily connected to each other and the fixture. Due to the size and weight of the panel components, it is desirable that the platform be large enough to accommodate more than one assembler. Once properly positioned, the panel components are tacked together to fix the relative positions of the members and to retain panel integrity until completion of the securement stage.

The securement stage includes a rivet fastening process wherein an automated attachment assembly such as an end effector or other rivet fastening tool is used to secure the panel components to one another. It is necessary to precisely position the attachment assembly relative to the panel in order to properly secure the panel members. The tacked panel is coupled to an assembly jig that includes a guide rail to which a securement tower is permanently yet movably connected. The securement tower includes the attachment assembly coupled to a platform and cooperates with the guide rail to limit the movement of the tower relative thereto.

Accordingly, a need exists for an assembly tower that provides both the freedom of movement needed in the assembly stage and the limited and precise positioning required during securement. It is further desirable that the tower include a mechanism providing precise movement of the platform relative to a tower base for properly positioning the operator or attachment assembly relative to the panel.

SUMMARY OF THE INVENTION

The present invention provides an assembly tower for use with an assembly jig having a tower guidance apparatus. The assembly tower includes a base, a platform coupled to the base for movement relative thereto, drive means for moving the base relative to the ground and for moving the platform relative to the base in response to selected control signals. Control means are included in the assembly tower for selectively generating and communicating the respective control signals to the drive means. Finally, the tower includes guidance means coupled to the base for selectively engaging the tower guidance apparatus so as to place the tower in an engaged position wherein the guidance means and the tower guidance apparatus cooperate to limit movement of the base relative to the ground.

A method is disclosed and claimed herein for assembling a structure using an assembly tower. The method includes the steps of erecting an assembly jig on a surface wherein the assembly jig includes a fixture and a guidance apparatus, positioning the assembly tower in a disengaged position, coupling a first member to the fixture and a second member to the first member, positioning the assembly tower to engage the guidance apparatus of the assembly jig, locating the assembly tower in a first assembly position relative to the fixture, and securing the second member to the first member.

BRIEF DESCRIPTION OF THE DRAWINGS

Other objects and advantages of the invention will become apparent upon reading the following detailed description and upon reference to the drawings, in which:

FIG. 1 is a perspective view of an assembly system in accordance with the present invention;

FIG. 2 is an exploded perspective view of the assembly tower shown in FIG. 1;

FIG. 3 is a sectional view taken along the line 3—3 of FIG. 1 illustrating an embodiment of a secondary base drive assembly;

FIG. 4 is a sectional view taken along the line 4—4 of FIG. 1 illustrating another embodiment of a secondary base drive assembly;

FIG. 5 is a perspective view of the assembly tower with portions thereof removed to more clearly illustrate the drive assembly therein;

FIG. 6 is a sectional view taken along the lines 6—6 of FIG. 5;

DETAILED DESCRIPTION

Figure 7:
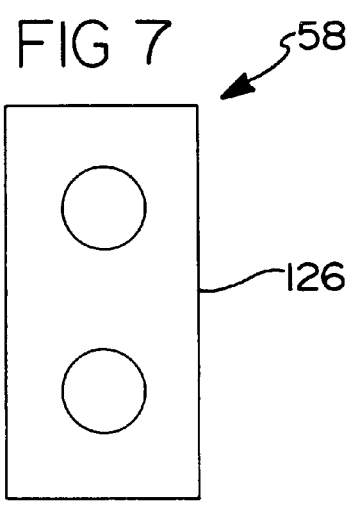
FIG. 7 is a top plan view of the assembly tower with the platform removed to illustrate a preferred orientation of the telescoping towers.

The following description of the preferred embodiment of the present invention is merely exemplary in nature and is not intended to limit the scope of the claimed invention. Moreover, the following description, while depicting the assembly tower for use with an assembly system for constructing an aircraft barrel panel, is intended to adequately teach one skilled in the art to make and use the assembly tower and system to assemble a variety of relatively large bodies. Specifically, those skilled in the art will appreciate that the assembly tower described and claimed herein is applicable in many manufacturing processes requiring the positioning and connection of structural members or the selective positioning of a human for assembly.

As illustrated in FIG. 1 of the drawings, the panel assembly system 10 is shown to include an assembly tower 12 and an assembly jig 14 having a fixture 16 supporting a panel 18. Assembly tower 12 is illustrated as being positionable in a first configuration 20 wherein the tower is freely movable relative to assembly jig 14 and a second position 22 wherein assembly tower 12 engages a guide rail 24 of assembly jig 14 thereby limiting the movement of assembly tower 12 to a direction along guide rail 24. As described in greater detail hereinafter, assembly tower 12 is selectively positionable into the first freely movable position 20 and the second position 22 in order to properly position and connect the various components of panel 18 to one another.

Panel 18 is shown to include a skin 28 coupled to fixture 14 and a plurality of stringers 30 and shear clips 32 coupled to skin 28 in a manner known in the art such as by rivets. A plurality of frame members 34 are similarly coupled to skin 28 via shear clips 32 preferably through the use of a connector apparatus mounted on assembly tower 12. Those skilled in the art will appreciate that in the assembly illustrated in FIG. 1, the construction of panel 18 is initiated by coupling skin 28 to assembly jig 14 and then connecting stringers 30, shear clips 32, and frame members 34 to the skin. Due to the large size of panel 18 and, particularly, the long and flexible nature of stringers 30, it is desirable to position the assembler on a platform that allows the assembler to have access to all areas of the assembly jig and panel.

After stringers 30, shear clips 32, and frame members 34 are loaded, skins 28 are placed on top of the assembly such as by cranes with guidance from assemblers standing on the assembly tower platforms. Each skin 28 is positioned in the assembly jig in a manner known in the art such as by using guidance holes for alignment and bandages that push the skin against stringers 30. It should be appreciated that the sequence of assembling panel 18 may be modified such as is illustrated in the alternative assembly system shown in FIG. 10 wherein stringers 230, shear clips 232, and frame members 234 are coupled to fixture 214 prior to the connection of skin 228.

Assembly tower 12 is configured in its freely movable first position 20 for use in the above described assembly stage. Assembly tower 12 also includes guidance means engageable with a guidance apparatus in second position 22 for precision movement during the securement stage. More particularly, as best seen in FIG. 2, assembly tower 12 generally includes a base 36 having a first drive assembly 38 and a second drive assembly 40 connected thereto. First drive assembly 38 preferably includes a first drive motor 42 coupled to rotatably drive an axle 44 having wheels 46 fixed for rotation therewith. A second wheeled axle 48 is also included with first drive assembly 38. It will be appreciated that first drive assembly is configured to freely move base 36 along the surrounding ground in response to input signals generated by manipulation of a controller (not shown).

Second drive assembly 40 is shown to include a second drive motor 50 coupled to rotate one of a pair of wheels 52 that are disposed within a passage 54 formed in base 36. In operation, wheels 52 engage a guidance assembly of assembly jig 14 as hereinafter described with reference to FIGS. 3 and 4.

A linear motion device 56 is shown to couple a vertical drive assembly 58 for linear motion relative to base 36. For example, linear motion device 56 may consist of the linear bearing system manufactured by Techno-isel U.S.A. Division, of New Hyde Park, N.Y. Linear motion device 56 is generally shown in FIG. 2 to include a pair of opposed, spaced apart, and parallel rails 59 each having a carriage 60 disposed thereupon for movement relative thereto. A drive motor 62 is coupled to rails 59 in a manner that moves carriages 60 in response to a control signal. For example, as in the Techno-isel device, drive motor 62 may be coupled to rotate a ball screw rotatably coupled to each rail 59 and having threads cooperative with ball nuts provided on carriage 60 thereby transferring the rotational motion of the ball screw into linear motion of the ball nuts and carriage 60.

Vertical drive assembly 58 is disposed between base 36 and a tower platform 64 to provide vertical movement of platform 64 relative to base 36 in a manner described in detail hereinafter with reference to FIGS. 5 and 6. A second linear motion device 66, substantially the same as linear motion device 56, couples an automated attachment assembly 68 to platform 64 for linear movement relative thereto. A controller 70 is secured to platform 64 and coupled for communication with each of the previously recited drive motors for controlling movement of drive assemblies 38, 40, 56, and 66 in a manner known in the art. It is contemplated that controller 70 may be a manually operated controller such as a foot pedal or a partially automated system such as a computer having a user interface.

Turning now to FIGS. 5 and 6 wherein a preferred structure of third drive assembly 58 is illustrated to include a drive motor 72 secured to platform 64 and coupled to rotate a shaft 74 having first and second geared hubs 76 and 78, respectively. A similar drive assembly is disclosed in U.S. Pat. No. 4,824,053, issued Apr. 25, 1989 and entitled "Telescopic Wing," the disclosure of which is incorporated herein by reference. A first toothed hub 79 on a first end 80 of a first telescoping drive shaft 82 and a second toothed hub 84 fixed on a second end 86 of a second telescoping drive shaft 88 are in intermeshed engagement with first and second geared hubs 76 and 78, respectively. Third drive assembly 58 further includes a pair of telescoping tubes 90 and 92 having alternating fixed and rotatable tubular sections 94 and 96, respectively. As best illustrated in FIG. 6, fixed tubular sections 94 have a first end 98 connected to a stabilizing board 100 and a second end 102 coupled to internal threads 104 formed on rotatable tubular section 96 such as by recirculating ball bearing bushings 106. In addition to internal threads 104, each rotatable tubular section 96 further includes external threads 108 engageable with recirculating ball bearing bushings 106. Rotatable section, 96 are coupled at an upper end 110 thereof to stabilizing board 100 such as by bearings 112 and coupled for rotation at a lower end 114 to one of the fixed tubular sections 94.

First and second telescoping drive shafts 82 and 88, respectively, are each preferably formed of a plurality of segments 116 disposed within each of the fixed and rotatable tubular sections 94 and 96. As illustrated in FIG. 6, each segment of the telescoping drive shafts include an annular flange 118 extending from a bottom end 120 thereof. An outer radial surface 122 of flange 118 is secured for rotation with rotatable tubular sections 96 and rotatably coupled to each fixed tubular sections 94 such as by bearings 124. An expandable cover 126 is connected to base 36 and platform 64 so as to enclose third drive assembly 58 within a chamber 128.

Figure 8:
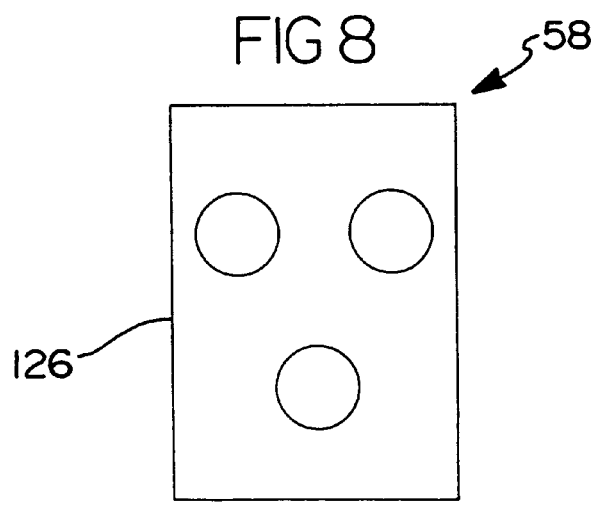
FIG. 8 is a top plan view of the assembly tower with the platform removed to illustrate another preferred orientation of the telescoping towers.
Figure 9:
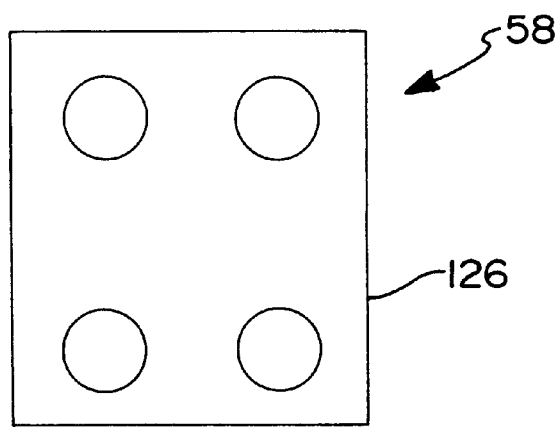
FIG. 9 is a top plan view of the assembly tower with the platform removed to illustrate a further preferred orientation of the telescoping towers.

Those skilled in the art will appreciate that the sections of each of the telescoping drive shafts 82 and 88, respectively, are coupled for rotation with one another such as by cooperating splines so as to transfer rotational motion therebetween. Further, telescoping columns 90 and 92 may be configured in a variety of positions relative to base 36 and platform such as is shown in FIGS. 7–9. More particularly, while a pair of telescoping columns is generally preferred in order to ensure proper stabilization and operation of third drive mechanism 58, additional members may be included for additional stabilization or strength such as is shown in FIGS. 8 and 9.

Turning now to FIGS. 1, 3, and 4, assembly tower 12 may be positioned in a first position 20 such that the tower is freely movable relative to panel 18 and assembly jig 14. In this arrangement, the operator may manipulate the various drive assemblies through controller 70 to achieve the desired platform position. It is contemplated that assembly tower 12 will be placed in first position 20 during the assembly stage of panel construction thereby providing the freedom of movement required to lay out and temporarily assemble panel 18 as heretofore described. Additionally, as also shown in FIG. 1, assembly tower 12 is positionable such that passage 54 engages guide rail 24 thereby limiting the movement of assembly tower 12 to a direction parallel to guide rail 24.

As shown in detail in FIGS. 3 and 4, a variety of drive assemblies may be used that cooperate with guide rail 24 to achieve the more precise movement desirable during the securement stage of panel assembly. More particularly, FIG. 3 illustrates that a first embodiment of second drive assembly 40 includes a pair of tower drive wheels 52 coupled for rotation relative to base 36 and to engage a center web 130 of guide rail 24. It should be appreciated that rotating drive wheels 52 are positioned relative to passage 54 to contact guide rail 24 thereby transferring the rotational movement of drive wheels 52 into linear movement of tower base 36.

In the alternate embodiment illustrated in FIG. 4, a pinion 132 is shown coupled for rotation to base 36 and engageable with a rack 134 fixed relative to center web 130 of guide rail 24. Accordingly, rotation of pinion 132 causes linear movement of base 36 relative to guide rail 24. FIGS. 3 and 4 each illustrate that a tower brake assembly 138 may include an active brake pad 140 and a reactive brake pad 142 coupled to base 36 for movement relative thereto from a disengaged position to an engaged position in response to a signal from controller 70.

Those skilled in the art will appreciate that the primary function of second drive assembly 40 is to provide more precise movement of base 36 relative to guide rail 24 and the surrounding ground. However, in the embodiment illustrated and described herein, first drive assembly 38 may, in certain instances, provide adequate motion control such that the second drive assembly is not required.

The assembly system and assembly tower described and shown herein advantageously allows free movement relative to an assembly jig 14 when in a first position 20 and limited movement when in a second position 22 wherein the assembly tower engages fixture guide rail 24. This arrangement allows a single assembly tower 12 to be transferred between various assembly stations as needed to most efficiently use the resources available at any time. Accordingly, the present invention reduces the initial investment and replacement costs needed to achieve and maintain an operational assembly system.

Finally, assembly tower 12 provides a platform that is precisely movable both vertically and horizontally thereby allowing an operator to selectively position platform 64 and assembly apparatus 68 relative to panel 18 and fixture 14. Moreover, as best seen in FIG. 1, it is contemplated that assembly apparatus 68 includes an end effector 144, such as, for example, an Alligator Type Drill/Rivet End Effector Model TFH manufactured by Brötje Automation located in Wiefelstede, Germany, coupled for rotation to a shaft 146. Shaft 146 is, in turn, fixed to a housing 148 that, as previously described, is coupled for linear motion relative to platform 64. Accordingly, end effector 144 is also precisely positionable to connect the various components of panel 18 such as by rivets.

Those skilled in the art will appreciate from the above description that assembly tower 12 is operable in a freely movable first mode when in first position 20 and a second, limited motion mode when in second position 22. It is preferred that the various drive assemblies of assembly tower 12 are governed by operator manipulation of a controller (not shown) such as a foot pedal when assembly tower 12 is in its freely movable first mode. Conversely, control of the movement and riveting operation of tower 12 in its second mode is preferably performed through a computer according to a pre-programmed sequence.

Figure 10:
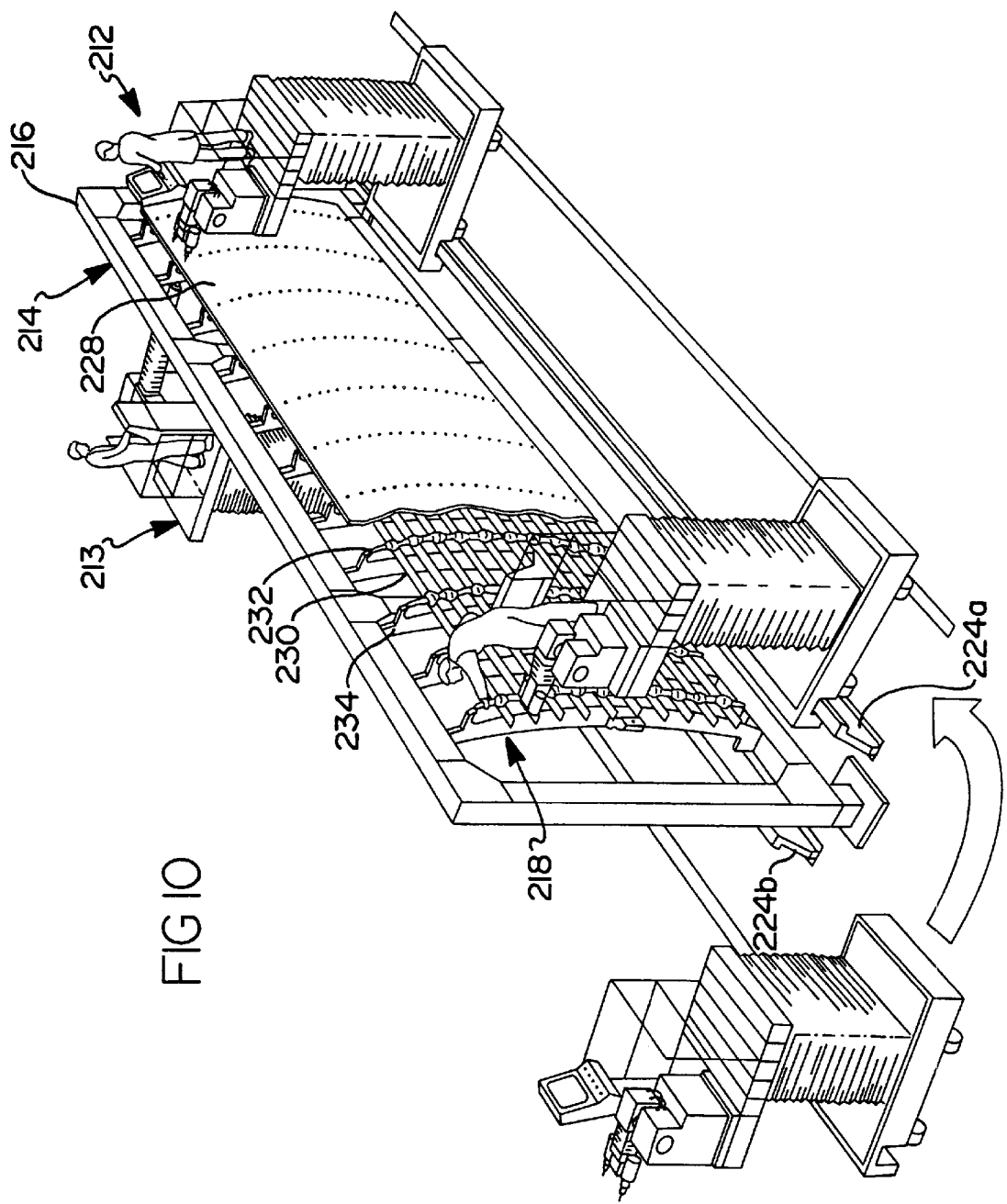
FIG. 10 is a perspective view of an alternative panel assembly system according to the present invention.

A particular application of the flexibility of assembly tower 12 is illustrated in FIG. 10 showing an alternative arrangement for assembling and securing panel 218. An assembly jig 214 includes fixture 216 supporting panel 218 and a pair of guide rails 224a and 224b cooperatively engaging a first assembly tower 212 and a second assembly tower 213, respectively. Each of assembly towers 212 and 213 are constructed and operative in the manner previously described. Those skilled in the art will appreciate that first assembly tower 212 is configured to connect skin 228 to frame members 234 such as by rivets as previously described while second assembly tower 213 is positioned to oppose first assembly tower 212 during the assembly process. The use of multiple assembly towers as illustrated in FIG. 10 provides an alternative to the one side riveting assembly shown in FIG. 1. By this alternative, skin 228 is positioned and coupled to stringers 230, shear clips 232, and frame members 234 as a final step in the assembly of panel 218.

In addition to the novel assembly tower disclosed and claimed herein, a corresponding method for using the assembly tower to assemble a structure is disclosed and claimed. Specifically, performance of the novel method includes erecting assembly jig 14, positioning assembly tower 12 in first freely movable position 20, and assembling panel 18 by placing the respective components thereof, skin 28, stringers 30, shear clips 32, and frame members 34, in their respective positions relative to each other and relative to assembly jig 14. As is discussed above, the respective components of panel 18 are then coupled to one another to maintain the integrity of panel 18.

Assembly tower 12 is then positioned in second position 22 for engagement with gLide rail 24 as previously described thereby limiting the horizontal movement of base 36. The permanent connection of the respective members of panel 18 is preferably performed by end effector 144. Initially, pre-drilled holes in stringers 30 and shear clips 32 are located by a vision system commonly known in the art such as, for example, the AdeptVision™ VME manufactured by Innovision Corporation of Madison, Wis. or the LumenX vision system manufactured by LumenX of Mogadore, Ohio. The vision system communicates with automated controller 70 which in turn properly positions end effector 144 relative to the respective components of panel 18. Once properly positioned, controller 70 signals end effector 144 to secure the respective members of the panel to one another.

Various other advantages of the present invention will become apparent to those skilled in the art after having the benefit of studying the foregoing text and drawings, taken in conjunction with the following claims.

What is claimed is:

1. An assembly tower apparatus for supporting a tool and for assisting in the construction of large aircraft components; said assembly tower apparatus comprising:

a base;

a platform operationally coupled to said base for supporting an indiviual thereon and for movement relative thereto;

a fastening tool disposed on said platform;

a drive system operatively associated with one of said base and said platform for moving said base freely on a ground surface and for moving said platform vertically relative to said base in response to a selected control signal;

a control system for selectively generating and communicating control signals to said drive means;

a tower guidance system disposed fixedly relative to said ground surface and adiacent said work-piece providing a defined path of movement adjacent said workpiece;

a guidance element associated with said base and engageable with said tower guidance system for limiting movement of said base on said ground surface in accordance with said defined path when said guidance element and said base are interengaged, and said base being freely moveable outside of said defined path when said guidance element is not engaged with said tower guidance system; and said control system being responsive to information input thereto by said individual to precisely control movement of said apparatus to thereby effect controlled movement of said platform in three axes and to cause said base to become engaged or disengaged with said guidance element.

2. The assembly tower apparatus of claim 1, wherein said drive system includes a first drive assembly and a drive motor, said first drive assembly operatively coupled to said base for movement relative thereto and to engage the ground surface, said drive motor communicating with said control system and coupled to drive said first drive assembly to move said base relative to the ground surface in response to said control signal.

3. The assembly tower of claim 1 wherein said drive system includes a second drive assembly and a drive motor, said second drive assembly including a guide and a carriage, said guide coupled to one of said base and said platform, said carriage coupled to the other of said one said base and said platform and movably engaging said guide, said drive motor communicating with said control system and coupled to said carriage to move said carriage relative to said guide in response to said control signal.

4. The assembly tower of claim 1, wherein said control system includes one of a manual control assembly coupled to said platform and an automated control assembly having a user interface coupled to said platform, each of said manual and automated control assemblies communicating with said drive system whereby an operator may control said drive system by selectively manipulating one of said manual control assembly and said user interface.

5. The assembly tower of claim 1, wherein said guidance element includes a passage defined in said base for accommodating the tower guidance system, a third drive assembly coupled to said base for movement relative thereto and to engage the tower guidance system, and drive motor communicating with said control system and coupled to drive said third drive assembly to move said base relative to said tower guidance system in response to said control signal.

6. The assembly tower of claim 5, wherein said third drive assembly includes a wheel coupled to said base for rotation relative thereto.

7. The assembly tower of claim 5, wherein said third drive assembly includes a rack coupled to said tower guidance apparatus and a pinion coupled to said base for rotation relative thereto.

8. The assembly tower of claim 1, wherein said drive system further includes a fourth drive assembly and a drive motor, said fourth drive assembly coupled to said platform and said base, said drive motor communicating with said control system and coupled to drive said fourth drive assembly to vertically move said platform relative to said base in response to said control signal.

9. The assembly tower of claim 8 wherein said fourth drive assembly includes a first member fixed to one of said platform and said base, a second member coupled for rotation relative to said first member by a first ball bearing bushing and to the other of said platform and said base by a second ball bearing bushing, said second member having external and internal threads engageable with said first and second ball bearing bushings, said second member coupled to said drive motor for rotation.

10. The assembly tower of claim 1 wherein said drive system includes a first drive assembly and a first drive motor, a second drive assembly and a second drive motor, a third drive assembly and a third drive motor, and a fourth drive assembly and a fourth drive motor, said first drive assembly being coupled to said base for movement relative thereto and to engage the ground surface, said second drive assembly including a guide and a carriage, said guide coupled to one of said base and said platform, said carriage coupled to the other one of said base and said platform and movably engageable with said guide, said third drive assembly coupled to said base for movement relative thereto and to engage the tower guidance system, said fourth drive assembly coupled to said platform and said base, said first drive motor communicating with said control system and coupled to said first drive assembly to move said base relative to the ground surface in response to said control signal, said second drive motor communicating with said control system and coupled to said carriage to move said carriage relative to said guide in response to said control signal, said third drive motor communicating with said control system and coupled to said third drive assembly to move said base relative to said tower guidance system in response to said control signal, and said fourth drive motor communicating with said control system and coupled to said fourth drive assembly to vertically move said platform relative to said base in response to said control signal.

11. An assembly apparatus for assisting with constructing large aircraft components comprised of a first member and a second member, said assembly apparatus comprising:

an assembly jig supported on a ground surface, said assembly jig including a fixture and a tower guidance apparatus, said fixture including means for supporting said first member and said second member fixedly relative to said assembly jig; and said tower guidance apparatus being fixedly disposed relative to said ground surface to define a predetermined path adjacent said assembly jig;

an assembly tower including a base, a platform operatively coupled to said base for movement relative thereto, a drive system coupled to one of said base and said platform for moving said base relative to the surface and for moving said platform relative to said base in response to a control signal, a control system for selectively generating and communicating control signals to said drive system and to a guidance system coupled to said base to make said guidance system selectively engageable with said tower guidance apparatus for placing said assembly tower in a disengaged position, wherein said base is freely movable in a plane substantially parallel to the ground surface, and an engaged position wherein said guidance system engages with said tower guidance apparatus to thereby limit movement of said base relative to the ground along said predetermined path.

12. The assembly system of claim 11, further including an attachment assembly system for effecting coupling of said first and second members to one another, said attachment assembly system communicating with said control system and being responsive to said control signals.

13. The assembly tower of claim 11, wherein said drive system includes a first drive assembly and a first drive motor, a second drive assembly and a second drive motor, a third drive assembly and a third drive motor, and a fourth drive assembly and a fourth drive motor, said first drive assembly coupled to said base for movement relative thereto and to engage the ground surface, said second drive assembly including a guide and a carriage, said guide coupled to one of said base and said platform, said carriage coupled to the other one of said base and said platform and movably engaging said guide, said third drive assembly coupled to said base for movement relative thereto and to engage the tower guidance apparatus, said fourth drive assembly coupled to said platform and said base, said first drive motor communicating with said control system and coupled to said first drive assembly to move said base relative to the ground surface in response to said control signals, said second drive motor communicating with said control system and coupled to said carriage to move said carriage relative to said guide in response to said control signals, said third drive motor communicating with said control system and coupled to said third drive assembly to move said base relative to said tower guidance apparatus in response to said control signals, and said fourth drive motor communicating with said control system and coupled to said fourth drive assembly to vertically move said platform relative to said base in response to said control signals.

14. The assembly tower of claim 13, wherein said third drive assembly further includes a brake selectively engageable to restrict movement of said base relative to said tower guidance apparatus.

15. The assembly tower of claim 13, wherein said third drive assembly includes a wheel rotatably coupled to said base, engageable with said tower guidance apparatus, and coupled to said third drive motor.

16. The assembly tower of claim 13, wherein said third drive assembly includes a rack connectable to the tower guidance apparatus and a pinion rotatably coupled to said base, engageable with said rack, and coupled to said third drive motor.

17. The assembly tower of claim 13, further including a second assembly tower, said second assembly tower including a base, a platform coupled to said base for movement relative thereto, a drive system coupled to one of said base and said platform for moving said base relative to the ground surface and for moving said platform relative to said base in response to a selected control signal, a control system for generating and communicating control signals to said drive system and a guidance element coupled to said base and selectively engageable with a tower guidance apparatus for placing said second assembly tower in one of a disengaged position, wherein said base is freely movable in a plane substantially parallel to the ground surface, and an engaged position wherein said guidance element and the tower guidance apparatus cooperate to limit movement of said base relative to the ground surface along a pre-defined path.

18. An assembly tower apparatus for facilitating construction of aircraft fuselage panels, said apparatus comprising;

a base;

a platform operatively associated with said base for supporting an individual thereon above said base;

a fastening tool disposed on said platform and controllable by said individual;

a first system for raising and lowering said platform relative to said base to thereby place said individual at a desired elevational position relative to a fuselage component;

a second system for propelling said base freely on a ground surface;

a guide mechanism independent of said base and said platform and fixed relative to said ground surface, and disposed adjacent said fuselage panel, for defining a pre-determined path of movement;

a guide element operably associated with said base and engageable with said guide mechanism;

a third system associated with said base and engageable with said guide mechanism for propelling said base along a path defined by said guide mechanism; and a control system controlled by an individual supported on said platform for generating control signals applied to said first, second and third systems such that said operator is able to control movement of said base freely about said ground surface or to cause said guide element of said base to become engaged with said guide mechanism, to thereby limit movement of said base to movement along said path defined by said guide mechanism.

* * * * *